United States Patent

[11] 3,589,801

| [72] | Inventor | Alan A. Masucci<br>1910 University Ave., New York, N.Y. 10003 |
|---|---|---|
| [21] | Appl. No. | 865,871 |
| [22] | Filed | Oct. 13, 1969 |
| [45] | Patented | June 29, 1971 |

[54] SPECTACLES WITH ADJUSTABLE LENSES
2 Claims, 8 Drawing Figs.

[52] U.S. Cl. ............................................. 351/55, 351/60
[51] Int. Cl. ..................................................... G02c 7/06
[50] Field of Search ......................................... 351/55, 60, 107

[56] References Cited
FOREIGN PATENTS
1,042,133  9/1966  Great Britain ................. 351/55

*Primary Examiner*—David Schonberg
*Assistant Examiner*—John W. Leonard
*Attorney*—William V. Pesce ABSTRACT: Spectacles with adjustable lenses which include a frame with extended arms and bridge, the bridge having catch lock means for holding fast a lens chassis capable of assuming one of two positions relative to frame. The lens chassis includes a pair of extended, resilient cantilever arms attached thereto at one extremity, the other extremity being attached to the frame, so that the combination becomes a pair of spectacles. The lens chassis permits one viewing area of the lens to be exposed when not in locked engagement with the frame at the catch lock, and another viewing area of the lens to be exposed when the catch lock is engaged.

INVENTOR
ALAN A. MASUCCI
BY
ATTORNEY

SPECTACLES WITH ADJUSTABLE LENSES

This invention relates generally to bifocal spectacles and is particularly directed to adjustable bifocal spectacles wherein the field of view may be alterable at will by the users without changing or altering the line of sight of the viewer.

It is an object of the present invention to provide a simple, rugged, easily adjustable pair of spectacles wherein the field of view is alterable without changing the line of sight of viewer.

Another object of the invention is to provide an adjustable pair of spectacles whose lenses may be adjusted to one of two positions to provide two different viewing areas of the lens.

Other objects and advantages will become apparent from a reading of the specification and a study of the accompanying drawings in which.

Figure 1:
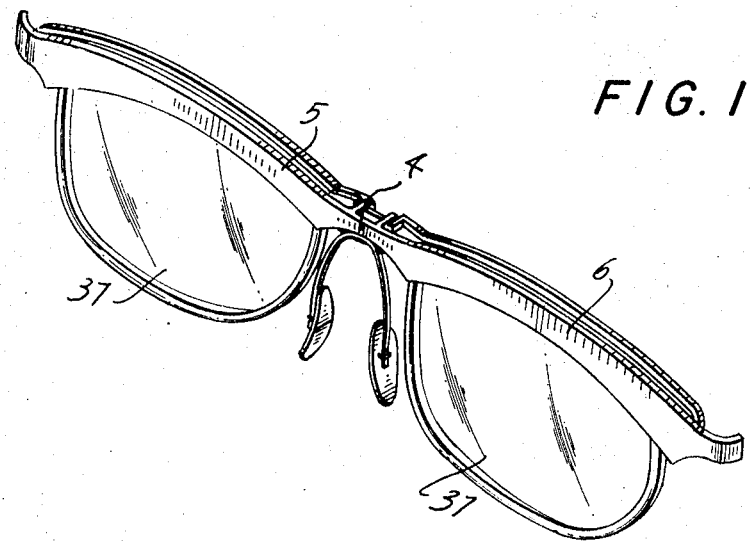
FIG. 1 shows a perspective view of the spectacles bearing frame and carriage according to the invention.

Now describing the invention with respect to the various FIGS. and throughout the specifications like parts will be given the same reference numbers, there is shown particularly in FIG. 1 a pair of spectacles 1 having a frame 2 and lens chassis 3 disposed to move relative thereto according to the invention described herein.

Figure 2A:
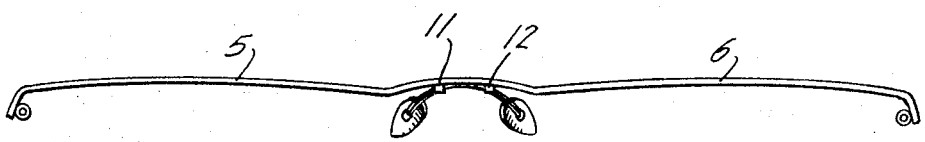
FIGS. 2a and 2b show plan and elevational views of the frame forming a part of the spectacles.
Figure 2B:
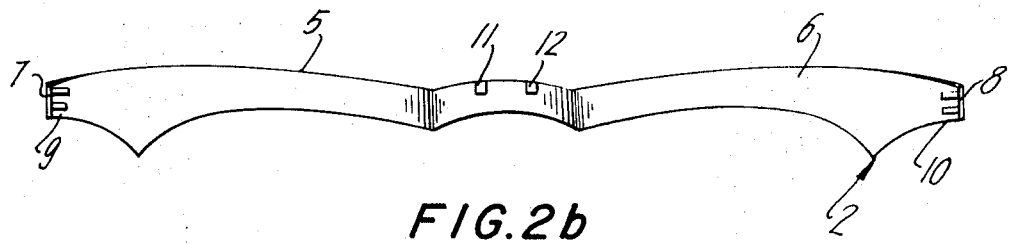

In particular, FIGS. 2a and 2b show a frame 2 composed of a central bridge 4 attached to on opposing sides a pair of extended arms 5 and 6 whose extremes 7 and 8 carry a pair of hinge joints 9 and 10 for pivotally mounting the forward ends of temples, not shown, in a well-known manner. The central bridge member 4 further includes a pair of spaced apart partially slotted portions 11 and 12 for receiving a catch, to be further explained. Although notches are shown, any well-known means for catch locking may be applicable.

Figure 3B:
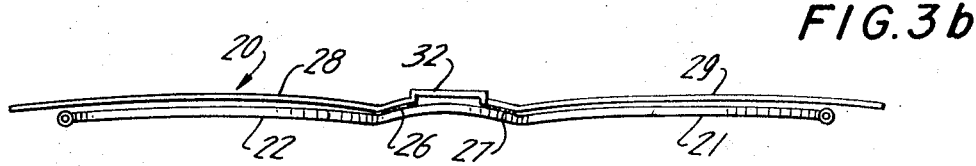
FIGS. 3a and 3b show plan and elevational views of lens chassis forming a part of the spectacles.
Figure 3A:
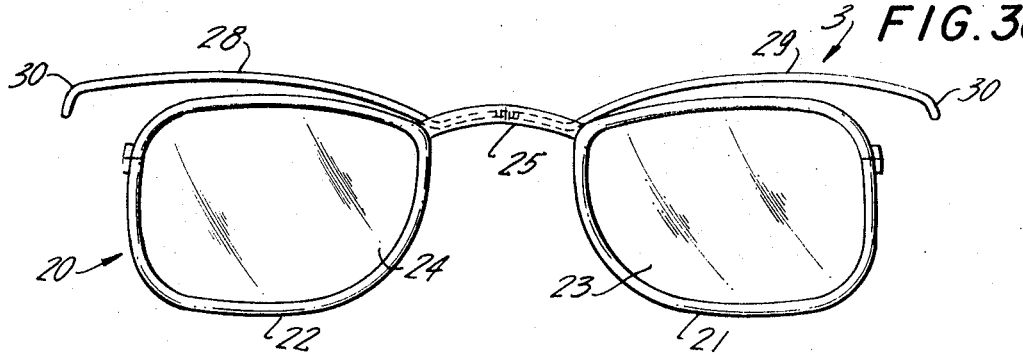

In FIGS. 3a and 3b there is shown a lens chassis 20 which includes lens rims 21, 22, each carrying a lens 23, 24 and each separated by a bridge 25 attached to the lens rims. The lens chassis further carries at the upper part thereof a pair of elongated cantilever-type arched springlike members 28, 29, the free ends thereof 30, 31 being used for attachment to the frame. The central portion of said bridge 25 has attached thereto a catch mechanism 32 in the form of a rectangular rim disposed to reside on and attach to the slotted portions 11 and 12 of the frame shown in FIG. 2. Here, again, any suitable catch can be used which will effect a lock with the frame.

Figure 4:
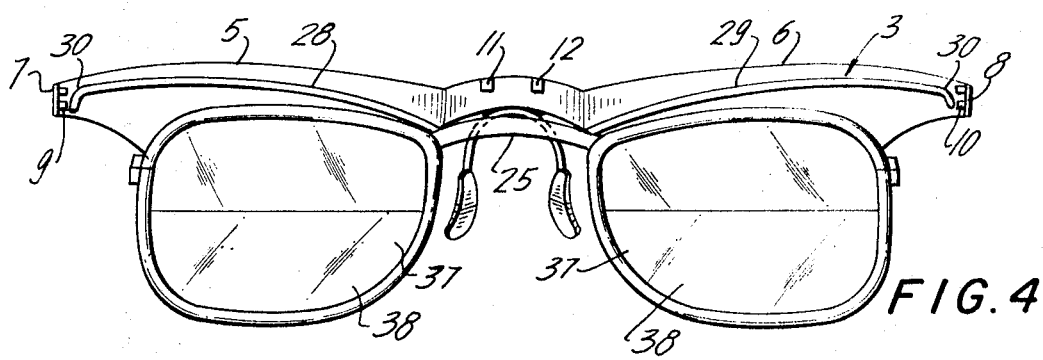
FIG. 4 shows the spectacles with lens chassis fully exposed.
Figure 5B:
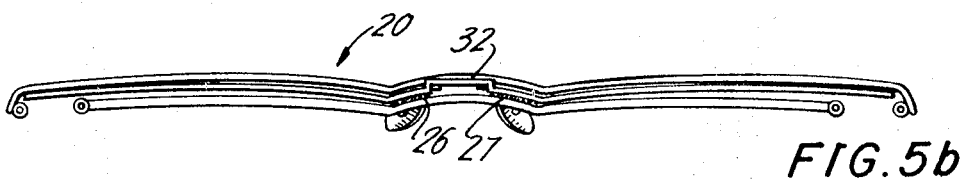
FIGS. 5a and 5b show plan and elevational views of the spectacles with lens chassis partially withdrawn so as to have the lens partially exposed.
Figure 5A:
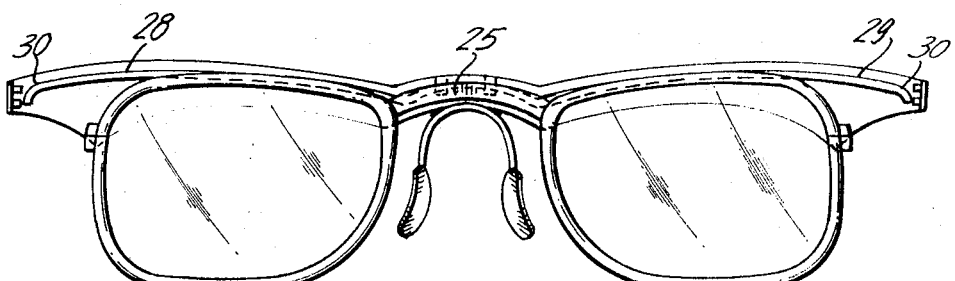

The frame of FIGS. 2a and 2b and the chassis of FIGS. 3a and 3b are attached to each other by anchoring the free ends 30, 31 of the cantilever members 28, 29 to the frame extremities by any suitable means such as soldering, welding, bonding and etc., as shown in FIG. 4. The anchoring provides positive support so that the frame and chassis form an integrated unit. The springlike cantilever members 28, 29 permit movement of the chassis relative to the frame in a vertical up and down springlike movement. Hence, as shown in FIG. 4, the lens chassis 20 is in its greatest downward displacement with respect to the frame so that the lens permit the user the greatest view. However, where the lens is bifocal, the viewer will be looking through the upper portion 37 of the lens rather than the lower portion 38. The movement of the lens chassis 20 upwardly relative to the frame, so as to permit the catch 32 to reside in notches 11 and 12 of the frame, permits the viewer to view the lower portion of lens 38 as in FIG. 5. Hence, simple, rapid and positive means is provided for adjusting the viewing area of the lens to permit the viewer to use different lens areas without changing or altering his line of sight which can be cumbersome and sometimes hazardous.

From the foregoing it may be appreciated that various changes in form and structure of either the lens chassis, frame and etc., may be made without altering the true intent and purpose of the invention which is to produce a flexible pair of spectacles which permit the user the use of different viewing areas with the simple expedient of making a quick adjustment of the frame and lens chassis without changing the user's line of sight.

Having defined the invention, what I claim is:

1. Spectacles with vertically adjustable multifocal lenses comprising:
   a. a frame including a bridge and elongated arm portions extending outwardly therefrom,
   b. nose support means depending from said bridge,
   c. a lens carrying bridge-type chassis for supporting a pair of rims and lens attached thereto,
   d. a pair of elongated cantilever springlike outwardly extending members carried by said lens chassis at each of one of their respective ends and connected at the other end to the outer arm portion of the frame, the chassis and frame when so attached permitting elastic resilient restorative relative movement of the chassis and frame to position one area of the lens before the wearer's eyes, and
   e. locking means connected to said frame and chassis along their respective bridge portions so as to permit the chassis and frame to maintain a fixed relative position when brought closer together against the restorative tension of the cantilever members so as to position a different area of said lens before the wearer's eyes.

2. Spectacles according to claim 1 and wherein said locking means includes a catch on said chassis and a lock on said frame for engaging said catch.